UNITED STATES PATENT OFFICE.

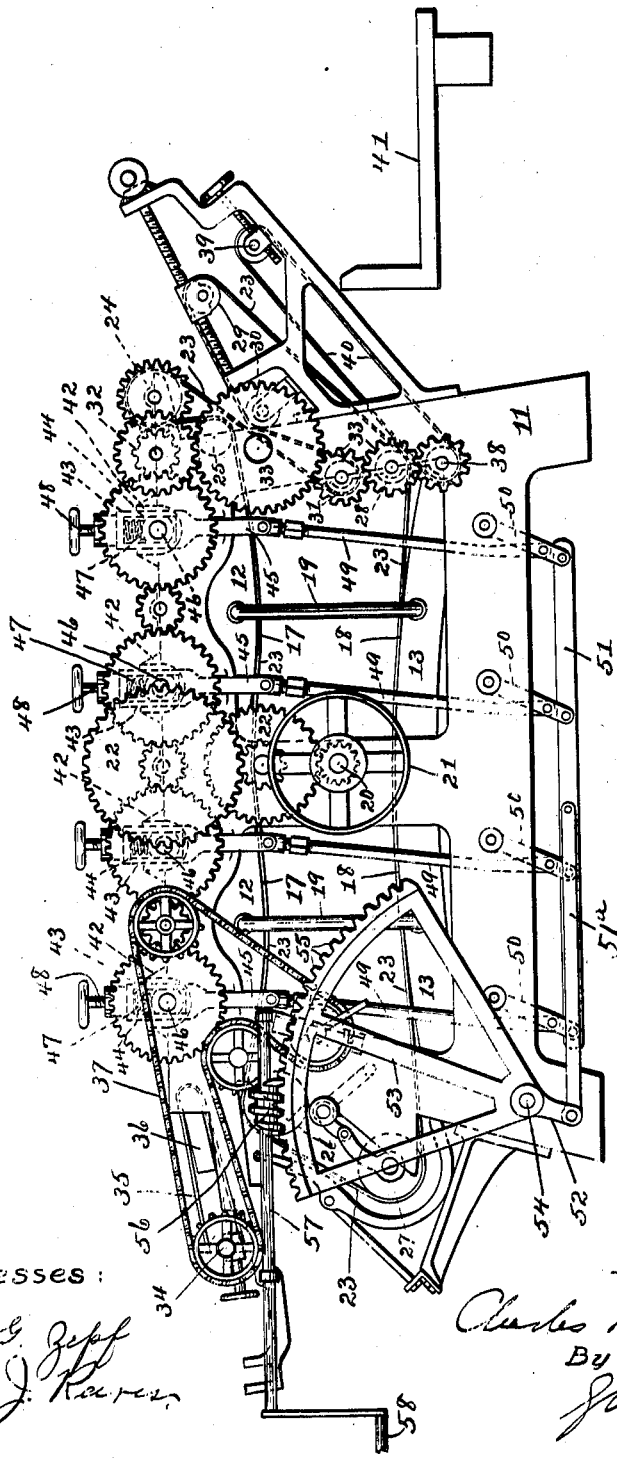

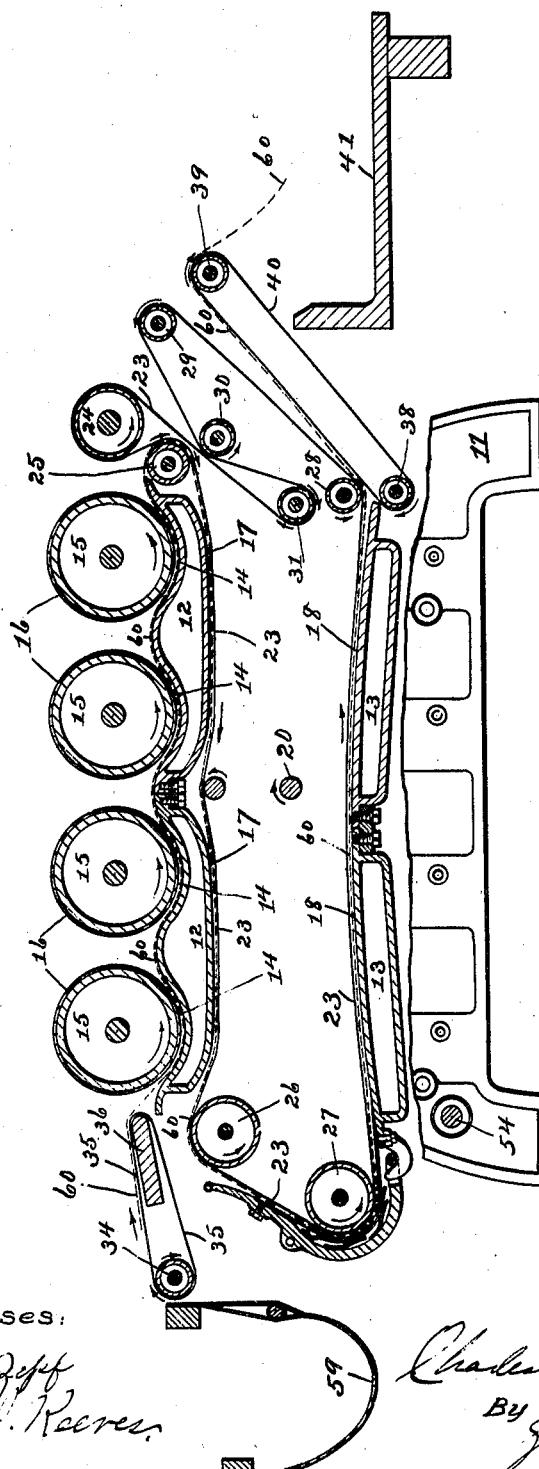

CHARLES H. MATTICE, OF TROY, NEW YORK, ASSIGNOR TO ADAMS LAUNDRY MACHINERY COMPANY, OF TROY, NEW YORK, A CORPORATION OF NEW YORK.

IRONING-MACHINE.

1,122,970.

Specification of Letters Patent. Patented Dec. 29, 1914.

Application filed August 5, 1913. Serial No. 783,023.

*To all whom it may concern:*

Be it known that I, CHARLES H. MATTICE, a citizen of the United States, and a resident of Troy, Rensselaer county, New York, have invented certain new and useful Improvements in Ironing-Machines, of which the following is a specification.

My invention relates to ironing machines, and particularly to such machines as are used for "flat work," as bed linen, napery and the like.

Its object is to provide for a very complete drying of the work by holding it in direct contact with a large amount of heated surface, and in addition to provide convenient means for varying the pressure of the pressing rolls.

In the drawings, Figure 1 is an end elevation of a machine embodying a preferred form of my devices; and Fig. 2, a partial transverse vertical section thereof.

11 designates the frame or standard of the machine, which supports an upper heated chest, 12, and a lower chest 13, each shown as formed of two sections and both extending substantially the length of the machine. The upper chest 12 is formed with a plurality, shown as four, of longitudinal concavities 14, corresponding in number, position and radius of arc with a plurality of presser rolls 15, supported as hereafter explained, and preferably padded with cloth, felt or the like indicated by 16. The under surface 17 of the upper chest 12 and the upper surface 18 of the lower chest 13, both shown as slightly convexed, are smooth and free from any obstruction. The chests 12—13, and preferably the rolls 15, are heated in any desired manner, advantageously by steam, the piping for which is shown in part at 19.

20 is the main shaft of the machine, shown as provided with a pulley 21, which may be belted to a line or counter shaft, not shown, and connected by a gear train 22 to rotate the rolls 15 in the direction shown by the arrows in Fig. 2.

An endless apron 23, the width of which corresponds to the length of chests 12 and 13 and rolls 15, is supported and moved in substantial contact, *i. e.*, so as to carry the work in direct contact, with the free surfaces, respectively under and upper, of chests 12 and 13. Its course and direction of movement are clearly shown in Fig. 2 where 24 is a drive roll around which apron 23 passes thence under carrying roll 25, under chest 12, around carrying rolls 26, 27, over chest 13, around idler roll 28, tightener roll 29, shifter roll 30 and spreader roll 31.

Pinion 32, by which roll 24 is connected to the last presser roll 15, and gears 33 leading to the active apron rolls, are shown in Fig. 1.

34 is a shaft on which is belted a series of tapes 35 which pass over the rounded edge of a board 36, the shaft being driven by a sprocket chain 37, see Fig. 1.

Two rear tape shafts 38, 39, driven by the gear train 33, carry a second series of tapes 40, shaft 39 being located above a receiving table 41.

As a means of supporting and vertically adjusting the presser rolls 15, I provide at the end of each roll a vertical guideway 42, in which slides a bearing-block 43 formed with an elongated opening 44 and a depending portion 45.

In the opening 44 is a movable bearing 46, normally forced downward by a spring 47, the pressure of which is adjustable by a screw 48.

At the lower end of the portion 45 is pivoted a bar 49, the lower end of which is also pivoted to a swinging link 50 on the frame 11. The lower ends of links 50 at each end of the machine are pivoted to a bar 51 which is pivotally connected by a horizontal link 51ª, to the short arm 52 of a sector lever 53 rigidly secured to a rock-shaft 54. The teeth 55 of the sector engage with a short worm 56 on a shaft 57 provided at the front of the machine with a crank 58.

The operation of the machine is as follows: The operator picks up the pieces or moist articles to be ironed and dried from the longitudinal pocket or work-holder 59 at the front of the machine and places them, one by one, on the feed tapes 35. These articles, indicated by the dotted line 60, are thus fed on to upper bed or chest 12 and successively under the presser rolls 15, which cause them to pass slowly over the heated bed and at the same time iron out all wrinkles. The articles then pass over roll 25 and on to apron 23, by which they are carried along in direct contact with the lower face of heated bed 12, over rolls 26, 27, and over the upper face of lower heated bed 13 and thence delivered on tapes 40, from which they drop on to table 41. It will be noted that no presser rolls are used to force the apron into contact with these heated bed faces, which are preferably convexed, as shown, to hold the apron closely thereagainst. By this combination of a minimum of moving parts and a maximum of heating surface, the goods are very thoroughly dried at a small power cost.

To adjust the presser rolls to compensate for the differences in the thicknesses of the goods, or to raise them clear of the concaved bed, it is only necessary for the operator to turn the crank 58 located at one or both sides of the front of the machine. Obviously, if the crank is turned so as to move the longer, toothed, end of lever 53 forward, the bar 51, linked to its shorter arm 52, will be moved rearward and, since it is supported by links 50, downward, thus drawing rolls 15 closer to bed 12. On the other hand, the rearward movement of the sector acts to move bar 51 forward and therefore upward, thus reducing the pressure of the rolls and eventually lifting them clear of the bed 12, so that the roll coverings may be removed and replaced as desired. It is understood that sufficient play is provided in gear train 22 for this purpose and that all the rolls are moved simultaneously and equally at both ends.

It will be understood that mechanical changes, other than those suggested, may be made in the device without departing from my invention; and that either of the principal features of the machine is operative and useful independently of the other.

What I claim is:
1. In an ironing machine, an upper heated bed having its upper face longitudinally concaved and its lower face free; pressing rolls of a diameter corresponding to the concavities in said bed and cooperative therewith; a lower heated bed having a free face; a single endless work-supporting apron; and means independent of pressing rolls for carrying said apron in substantial contact with the free faces of both said beds and so as to carry the work in direct contact therewith.

2. In an ironing machine, an upper heated bed having its upper face longitudinally concaved and its lower face free; pressing rolls of a diameter corresponding to the concavities in said bed and cooperative therewith; a lower heated bed having a free convex upper face; a single endless work-supporting apron; and means independent of pressing rolls for carrying said apron in substantial contact with the free faces of both said beds and so as to carry the work in direct contact therewith.

3. In an ironing machine, a frame; a heated bed having its upper face longitudinally concaved; pressing rolls of a diameter corresponding to the concavities in said bed and cooperative therewith; and means for adjusting said rolls including a longitudinal rock-shaft, a link-supported bar at each end of said frame and movable with said shaft, an independent vertically movable bearing for each of said rolls, a link-bar connecting each of said bearings to a link supported bar; and manual means including a sector rack on said rock-shaft and a worm engaging therewith for rocking said shaft.

4. In an ironing machine, a frame; a heated bed; pressing rolls; and means for adjusting said rolls including a longitudinal rock-shaft, a link-supported bar at each end of said frame and movable with said shaft, an independent vertically movable bearing for each of said rolls, a link-bar connecting each of said bearings to a link-supported bar; and manual means, including a sector rack on said rock-shaft and a worm engaging therewith for rocking said shaft.

CHARLES H. MATTICE.

Witnesses:
 GEO. L. COOPER,
 WILLIAM COLVIN, Jr.